US008722189B2

(12) United States Patent
Fujii

(10) Patent No.: US 8,722,189 B2
(45) Date of Patent: May 13, 2014

(54) COVER GLASS FOR MOBILE TERMINALS, MANUFACTURING METHOD OF THE SAME AND MOBILE TERMINAL DEVICE

(75) Inventor: Tatsuya Fujii, Tokyo (JP)

(73) Assignee: Hoya Corporation, Tokyo (JP)

( * ) Notice: Subject to any disclaimer, the term of this patent is extended or adjusted under 35 U.S.C. 154(b) by 399 days.

(21) Appl. No.: 12/808,338

(22) PCT Filed: Dec. 16, 2008

(86) PCT No.: PCT/JP2008/072863
§ 371 (c)(1),
(2), (4) Date: Aug. 17, 2010

(87) PCT Pub. No.: WO2009/078406
PCT Pub. Date: Jun. 25, 2009

(65) Prior Publication Data
US 2011/0003619 A1 Jan. 6, 2011

(30) Foreign Application Priority Data
Dec. 18, 2007 (JP) ................................. 2007-325542

(51) Int. Cl.
| | |
|---|---|
| C03C 15/02 | (2006.01) |
| C03C 21/00 | (2006.01) |
| C03C 3/083 | (2006.01) |
| H04M 1/03 | (2006.01) |
| H04M 1/02 | (2006.01) |

(52) U.S. Cl.
CPC ............... *C03C 15/02* (2013.01); *C03C 3/083* (2013.01); *C03C 21/002* (2013.01); *H04M 1/0266* (2013.01)
USPC .......................................... 428/410; 428/192

(58) Field of Classification Search
None
See application file for complete search history.

(56) References Cited

U.S. PATENT DOCUMENTS

| | | | |
|---|---|---|---|
| 7,309,671 B2 * | 12/2007 | Kurachi et al. .................. 501/70 |
| 2003/0134734 A1 * | 7/2003 | Nishimoto et al. ............. 501/69 |
| 2003/0172677 A1 * | 9/2003 | Miyamoto et al. ........... 65/30.14 |
| 2004/0137828 A1 * | 7/2004 | Takahashi et al. .............. 451/41 |
| 2004/0194508 A1 * | 10/2004 | Nishimoto et al. ............ 65/33.1 |
| 2006/0228997 A1 * | 10/2006 | Chida et al. ..................... 451/11 |
| 2007/0178281 A1 * | 8/2007 | Nakamura et al. ............ 428/141 |
| 2008/0241603 A1 * | 10/2008 | Isono ......................... 428/846.9 |
| 2008/0311487 A1 * | 12/2008 | Ito et al. ........................... 430/5 |
| 2009/0280241 A1 * | 11/2009 | Iwata ............................ 427/129 |
| 2010/0279067 A1 * | 11/2010 | Sabia et al. ................... 428/141 |

FOREIGN PATENT DOCUMENTS

| | | |
|---|---|---|
| JP | 63-040734 A | 2/1988 |
| JP | 63-248730 A | 10/1988 |
| JP | 64-52629 | 2/1989 |

(Continued)

*Primary Examiner* — David Sample
(74) *Attorney, Agent, or Firm* — Harness, Dickey & Pierce, PLC

(57) ABSTRACT

To provide cover glass for mobile terminals exhibiting high strength in a thin plate thickness state to enable reductions in thickness of apparatuses when inserted in the apparatuses, cover glass (1) for a mobile terminal of the invention is cover glass (1) that is obtained by forming a resist pattern on main surfaces of a plate-shaped glass substrate, then etching the glass substrate with an etchant using the resist pattern as a mask, and thereby cutting the glass substrate into a desired shape and that protects a display screen of the mobile terminal, where an edge face of the cover glass (1) is formed of a molten glass surface, and as surface roughness of the edge face, arithmetic mean roughness Ra is 10 nm or less.

20 Claims, 3 Drawing Sheets

(56) References Cited

FOREIGN PATENT DOCUMENTS

| | | |
|---|---|---|
| JP | 2004-299199 A | 10/2004 |
| JP | 2005-219960 | 8/2005 |
| JP | 2007-99557 | 4/2007 |
| JP | 2007-099557 A | 4/2007 |
| WO | WO2007/111149 A1 * | 10/2007 |

* cited by examiner

COVER GLASS FOR MOBILE TERMINALS, MANUFACTURING METHOD OF THE SAME AND MOBILE TERMINAL DEVICE

CROSS-REFERENCE TO RELATED APPLICATIONS

This application is a 371 U.S. National Stage of International Application No. PCT/JP2008/072863, filed Dec. 16, 2008. This application claims the benefit of Japanese Patent Application No. JP 2007-325542, filed Dec. 18, 2007. The disclosures of the above applications are incorporated herein by reference.

TECHNICAL FIELD

The present invention relates to cover glass used in protecting a display screen of a mobile terminal device such as, for example, a cellular phone and PDA (Personal Digital Assistant), manufacturing method of the cover glass and mobile terminal device.

BACKGROUND ART

In a mobile terminal device such as a cellular phone and PDA, to prevent a shock and external force from being applied to the display, a protective plate made of plastic, for example, protective plate made of acrylic resin with high transparency is disposed at a predetermined distance outside the display (for example, Patent Document 1).

However, since the protective plate made of acrylic resin tends to bend by external force, it is necessary to set the distance between the protective plate and display at a large extent to which the bending can be absorbed. Further, it is required to increase the thickness to provide the protective plate made of acrylic resin with strength to some extent. Therefore, it has become difficult to actualize thinner mobile terminal devices.

Then, to actualize thinner mobile terminal devices, proposed is a protective plate using chemically strengthened glass which suppress bending and is a thin plate while having strength (for example, Patent Document 2). Patent Document 2 describes cover glass for mobile terminals obtained by cutting plate glass of a specific glass composition into a predetermined shape, chamfering the edge face, performing mirror polishing processing on both surfaces, and then forming a compressive stress layer in the surface by chemical strengthening, thereby suppressing its bending and reducing its tendency to break, and a manufacturing method of the cover glass.

Patent Document 1: Japanese Unexamined Patent Publication No. 2004-299199
Patent Document 2: Japanese Unexamined Patent Publication No. 2007-99557

DISCLOSURE OF INVENTION

Meanwhile, in recent years, in mobile terminal devices such as cellular phones and PDA, competition among apparatus manufacturers has intensified, and required are expensive-looking high-fashion mobile terminal devices, as well as sliming down and high functionality of mobile terminal devices. High-fashion is also required for cover glass, and cover glass is requested in complicated shapes as a shape of the external form of the cover glass, starting conventional simple rectangle shapes, such as shapes (for example, shapes with the negative curvature such that some side constituting the cover glass is largely dented inward) in accordance with the shape of a display screen of the apparatus, and other shapes such that a hole is formed on the main surface of the cover glass.

However, in the conventional processing method as described in Patent Document 2, surface roughness is coarse in the cover glass edge face, micro-cracks ranging from about dozens to hundreds of micrometers exist on the chamfering-processed surface of the cover glass edge face, and a problem thereby arises that it is not possible to obtain mechanical strength required for the cover glass for mobile terminals. Further, in the conventional processing method as described in Patent Document 2, cover glass in complicated shapes as described above is not obtained, or if such cover glass is obtained, the mechanical strength is extremely low, the processing cost is high, and the cover glass is not put to practical use under present circumstances.

The present invention was made in view of the problems, and it is an object of the invention to provide cover glass satisfying high mechanical strength required for cover glass for a mobile terminal even in a complicated shape, manufacturing method of the cover glass and a mobile terminal device with a display screen having high mechanical strength.

Cover glass for a mobile terminal of the invention is cover glass that is obtained by cutting a plate-shaped glass substrate into a desired shape by etching and that protects a display screen of the mobile terminal, and is characterized in that an edge face of the cover glass is formed of a molten glass surface, and that as surface roughness of the edge face, arithmetic mean roughness Ra is 10 nm or less.

The cover glass for a mobile terminal according to this configuration is obtained by cutting a plate-shaped glass substrate into a desired shape by etching without undergoing mechanical processing, thereby has high smoothness of the order of nanometers such that surface roughness of the edge face of the cover glass is 10 nm or less, as compared with cover glass undergoing external form formation by mechanical processing, and thus has a surface state with extremely high smoothness further without micro-cracks that are certainly formed in performing external form formation by mechanical processing. Therefore, even when the shape of the external form of the cover glass for a mobile terminal is a complicated shape, it is possible to satisfy high mechanical strength required for the cover glass for a mobile terminal.

In the cover glass for a mobile terminal of the invention, the main surface of the cover glass is formed of a molten glass surface formed by a down-draw method, and as surface roughness of the main surface, arithmetic mean roughness Ra is preferably 0.5 nm or less. According to this configuration, the cover glass becomes further excellent in mechanical strength.

In the cover glass for a mobile terminal of the invention, the desired shape is preferably a shape including a portion having the negative curvature in part of a contour constituting the cover glass.

In the cover glass for a mobile terminal of the invention, a plate thickness of the cover glass is preferably 0.5 mm or less.

In the cover glass for a mobile terminal of the invention, the cover glass is preferably aluminosilicate glass containing at least one selected from the group consisting of $SiO_2$, $Al_2O_3$, $Li_2O$ and $Na_2O$. According to this configuration, it is made possible to form the plate-shaped glass substrate by a down-draw method (fusion method), and the main surface of the glass substrate can be a molten glass surface having extremely high smoothness of the order of nanometers without flaws. Accordingly, the need for performing mirror polishing processing on the main surface is eliminated in fabricating the cover glass, and the cover glass without microcracks even in the main surface is obtained and becomes the cover glass excellent in mechanical strength. Further, since chemically strengthening by ion exchange is made possible, it is possible to further enhance the mechanical strength.

In the cover glass for a mobile terminal of the invention, the aluminosilicate glass preferably contains 62 percent to 75 percent by weight of $SiO_2$, 5 percent to 15 percent by weight of $Al_2O_3$, 4 percent to 10 percent by weight of $Li_2O$, 4 percent to 12 percent by weight of $Na_2O$, and 5.5 percent to 15 percent by weight of $ZrO_2$. According to this configuration, stable glass manufacturing is made possible, and obtained is glass excellent in mechanical strength. Further, the cover glass for a mobile terminal is used in significantly severe environments such that the cover glass comes into contact with human skin, water, rain, etc. and even in such environments, is capable of having sufficient chemical durability.

In the cover glass for a mobile terminal of the invention, the cover glass is preferably glass that is chemically strengthened by ion exchange treatment. Further, the cover glass preferably has compressive stress layers in the main surface and the edge face. According to this configuration, the surfaces of cover glass are chemically strengthened, the compressive stress layers are further formed in the surfaces (main surfaces and the edge face), and it is thereby possible to further increase the mechanical strength.

In the cover glass for a mobile terminal of the invention, the edge face of the cover glass preferably has a protruding center portion, and inclined surfaces inclined respectively toward both main surface sides from the center portion. According to this configuration, in inserting the cover glass in a frame or the like of a mobile terminal device, it is possible to insert the glass with ease without galling and/or chipping occurring.

A method of manufacturing cover glass for a mobile terminal of the invention is a method of manufacturing cover glass for a mobile terminal for protecting a display screen of the mobile terminal, and is characterized by forming a resist pattern on main surfaces of a plate-shaped glass substrate, then etching the glass substrate with an etchant of a mixed acid aqueous solution containing hydrofluoric acid and at least one kind of acid among sulfuric acid, nitric acid, hydrochloric acid, and hydrofluorosilicic acid using the resist pattern as a mask, and thereby cutting the glass substrate into a desired shape.

According to this method, in cutting the plate-shaped glass substrate into a desired shape by etching without performing mechanical processing, since a mixed acid aqueous solution containing hydrofluoric acid and at least one kind of acid among sulfuric acid, nitric acid, hydrochloric acid, and hydrofluorosilicic acid is used as an etchant, the cover glass having an extremely high surface state is obtained such that surface roughness of an edge face of the cover glass cut into the desired shape has high smoothness of the order of nanometers, and that micro-cracks do not exist which are certainly formed in forming the external form by mechanical processing. Further, since it is possible to adopt photolithography in forming the resist pattern, dimensional accuracy of the cut cover glass is also excellent. Accordingly, even when the shape of the external form of the cover glass for a mobile terminal is a complicated shape, the cover glass with good dimensional accuracy is obtained, and it is possible to obtain high mechanical strength required for the cover glass for a mobile terminal.

In the method of manufacturing cover glass for a mobile terminal of the invention, the plate-shaped glass substrate is preferably formed by a down-draw method. This is because both main surfaces of the plate-shaped glass substrate formed by the down-draw method have surfaces formed by hot forming, and thereby have extremely high smoothness of the order of nanometers, and surface states without micro-cracks. Further, since it is possible to perform etching uniformly from the both main surfaces in etching the glass substrate from the both main surfaces using resist patterns formed on the both main surfaces of the glass substrate as a mask, dimensional accuracy is good, and the shape in cross section of the edge face of the cover glass is excellent, thus being preferable.

In the method of manufacturing cover glass for a mobile terminal of the invention, the desired shape is preferably a shape including a portion having the negative curvature in part of a contour constituting the cover glass.

In the method of manufacturing cover glass for a mobile terminal of the invention, the cover glass is preferably aluminosilicate glass containing at least one selected from the group consisting of $SiO_2$, $Al_2O_3$, $Li_2O$ and $Na_2O$. According to this method, since it is made possible to form the plate-shaped glass substrate by a down-draw method, the main surface of the glass substrate does not have flaws, and obtains a surface state having extremely high smoothness of the order of nanometers. Accordingly, the need for performing mirror polishing processing on the main surface is eliminated in fabricating the cover glass, and the cover glass without micro-cracks even in the main surface is obtained and becomes the cover glass excellent in mechanical strength. Further, since chemical strengthening by ion exchange is made possible, it is possible to further enhance the mechanical strength.

In the method of manufacturing cover glass for a mobile terminal of the invention, after cutting into the desired shape, it is preferable to perform chemically strengthening on the cut glass substrate by ion exchange treatment. According to this method, the compressive stress layers are formed in the entire surfaces (main surfaces and the edge face) constituting the cover glass, and it is thereby possible to further increase the mechanical strength.

A mobile terminal device of the invention is characterized by having an apparatus body having a display screen, and the above-mentioned cover glass for a mobile terminal provided above the display screen. According to this configuration, it is possible to provide a mobile terminal device with the screen display having high mechanical strength.

In the cover glass for a mobile terminal of the invention, even when the shape is complicated, it is possible to obtain high mechanical strength required for the cover glass for a mobile terminal. Further, in the mobile terminal device of the invention, even when the cover glass protecting the display screen has a complicated shape, it is possible to obtain the mobile terminal device with the display screen having high mechanical strength.

BEST MODE FOR CARRYING OUT THE INVENTION

An Embodiment of the invention will specifically be described below with reference to accompanying drawings.

Figure 1:
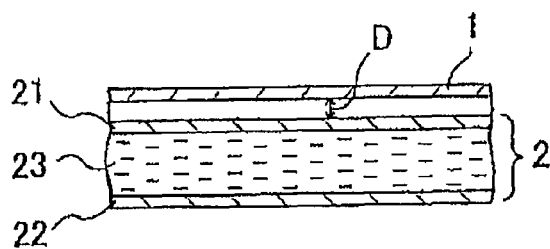
FIG. 1 is a cross-sectional view showing part of a mobile terminal equipped with cover glass for mobile terminals according to an Embodiment of the invention.

FIG. 1 is a cross-sectional view showing part of a mobile terminal device equipped with cover glass for mobile terminals according to an Embodiment of the invention. In the mobile terminal device as shown in FIG. 1, cover glass 1 is disposed at a distance D above a liquid crystal display panel 2. The liquid crystal display panel 2 is configured such that a pair of glass substrates 21 and 22 sandwich a liquid crystal layer 23. In addition, in FIG. 1, the other members are omitted which are generally used in a liquid crystal display panel.

Figure 3:
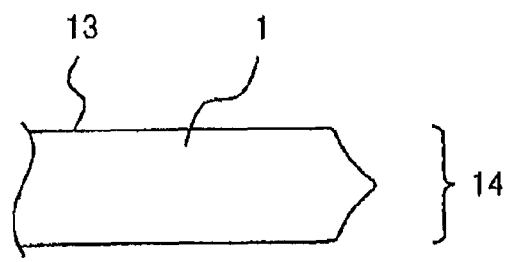
FIG. 3 is a diagram showing a shape of an edge face of the cover glass as shown in FIG. 2.

The cover glass in this Embodiment of the invention is obtained by forming a resist pattern on a main surface of a plate-shaped glass substrate, then etching the glass substrate with an etchant using the resist pattern as a mask, and thereby cutting the glass substrate into a desired shape, while an edge face 14 of the cover glass 1 as shown in FIG. 3 is formed of a molten glass surface, and surface roughness (arithmetic mean roughness Ra) in the edge face 14 is 10 nm or less. Thus, in the cover glass according to the invention, since the external form is formed by etching, the edge face 14 formed by etching has extremely high smoothness, is formed of the molten glass surface, and therefore, is in a state without micro-cracks that certainly exist on an edge face formed by mechanical processing. In the cover glass with such a configuration, even when the shape of the external form of the cover glass for mobile terminals is a complicated shape, it is possible to process the external form into a desired shape with ease, and it is possible obtain high mechanical strength required for cover glass for mobile terminals.

Further, for example, even when the plate thickness is 0.5 mm or less and thus thin, it is possible to maintain high mechanical strength. When such cover glass with a thin thickness is inserted in an apparatus, since the cover glass is hard to bend by external force due to the high mechanical strength, it is possible to reduce the distance between the cover glass and display. As a result, it is possible to intend to thin the apparatus.

In addition, as an etching method to etch the glass substrate, either of wet etching and dry etching is available. From the viewpoint of reducing the processing cost, wet etching is preferable. Any etchant capable of etching a glass substrate can be used as an etchant used in wet etching. For example, it is possible to use an acidic solution containing hydrofluoric acid as the main ingredient, mixed acid containing hydrofluoric acid and at least one kind of acid among sulfuric acid, nitric acid, hydrochloric acid, and hydrofluorosilicic acid, etc. Further, as an etchant used in dry etching, any etchant capable of etching a glass substrate can be used, and for example, it is possible to use fluorine gas.

Moreover, the cover glass 1 of the invention can be formed in a shape including a portion having the negative curvature in part of a contour constituting the cover glass as shown in FIG. 2(a). Herein, the positive curvature and negative curvature are defined. It is assumed that the contour constituting the cover glass is represented by curve C1 and curve C2 as shown in FIG. 2(b), and that the cover glass is represented by area A. At this point, when the contour constituting the cover glass is traced while always seeing the inside of the area A on the left side, a portion of the contour turning to the left as proceeds is defined as the positive curvature, another portion of the contour turning to the right as proceeds is defined as the negative curvature, and the curvature of a straight portion that turns to neither the left nor right is defined as "0". Accordingly, the curve C1 as shown in FIG. 2(b) is a curve having the positive curvature, and the curve C2 as shown in FIG. 2(b) is a curve having the negative curvature. Further, also when the contour constituting the cover glass is complicated and becomes a shape as shown in FIG. 2(c), according to the aforementioned definition, a segment C+ is the positive curvature, a segment C− is the negative curvature, and the curvature of a segment C0 is "0".

When the negative curvature is defined as described above, the portion having the negative curvature in the cover glass 1 as shown in FIG. 2(a) means corner portions 121 of a hole portion 12, corner portions 111 of a concave portion 11, etc. which are formed within the main surface of the cover glass 1.

Such a shape including portions having the negative curvature is a shape hard to process by mechanical processing that is the external form processing in the ordinary manufacturing process of the glass substrate. It is possible to actualize such a shape with ease by using photolithography and etching as described later. In addition, the corner portion 121 of the hole portion 12 and the corner portion 111 of the concave portion 11 described herein do not include portions caused by chipping of the glass or surface roughness and surface swell comprised of minute convex portion and/or concave portion formed on the cover glass surface. In other words, such portions do not include a convex portion caused by chipping of the glass in the portion having the positive curvature, concave portion in surface roughness or surface swell, or the like.

The cover glass 1 can be fabricated using a plate-shaped glass substrate (sheet glass) formed by a down-draw method. Among glass enabling glass plate formation by a down-draw method is aluminosilicate glass containing $SiO_2$, $Al_2O_3$, $Li_2O$ and/or $Na_2O$. In particular, the aluminosilicate glass preferably contains 62 percent to 75 percent by weight of $SiO_2$, 5 percent to 15 percent by weight of $Al_2O_3$, 4 percent to 10 percent by weight of $Li_2O$, 4 percent to 12 percent by weight of $Na_2O$, and 5.5 percent to 15 percent by weight of $ZrO_2$. Further, such a composition is preferable that the ratio by weight of $Na_2O/ZrO_2$ ranges from 0.5 to 2.0, and that the ratio by weight of $Al_2O_3/ZrO_2$ ranges from 0.4 to 2.5.

$SiO_2$ is the prime component forming a glass skeleton. The cover glass for mobile terminal devices, particularly, for cellular phones is used in significantly severe environments such that the cover glass comes into contact with human skin, water, rain, etc. and even in such environments, is required to exert sufficient chemical durability. With consideration given to the chemical durability and melting temperature, the content of $SiO_2$ preferably ranges from 62 percent by weight to 75 percent by weight.

$Al_2O_3$ is contained to enhance ion exchange performance of the glass surface. Further, the cover glass for mobile terminals needs to have viewability i.e. transparency. With consideration given to chemical durability and transparent durability, the content of $Al_2O_3$ preferably ranges from 5 percent by weight to 15 percent by weight.

$Li_2O$ is ion-exchanged with Na ion mainly in an ion exchange treatment bath in the glass surface portion, and is thus an essential component in chemically strengthening the glass. With consideration given to ion exchange performance, transparent resistance and chemical durability, the content of $LiO_2$ preferably ranges from 4 percent by weight to 10 percent by weight.

$Na_2O$ is ion-exchanged with K ion in the ion exchange treatment bath in the glass surface portion, and is thus an essential component in chemically strengthening the cover glass. Further, the mobile terminal device is used under circumstances where shock and/or external force is applied to the display screen by dropping the apparatus, pressing the display screen repeatedly, or by opening and closing in the case of open/close type mobile terminal devices, and even in such use environments, is required to need sufficient mechanical strength. With consideration given to the mechanical strength, transparent resistance and chemical durability, the content of $Na_2O$ preferably ranges from 4 percent by weight to 12 percent by weight.

$ZrO_2$ has the effect of increasing the mechanical strength. With consideration given to chemical durability and stable manufacturing of homogenous glass, the content of $ZrO_2$ preferably ranges from 5.5 percent by weight to 15 percent by weight.

Further, in the aforementioned aluminosilicate glass, by performing chemical strengthening by ion exchange treatment, and thereby forming a compressive stress layer in the glass surface, it is possible to further increase the mechanical strength. In addition, as a substitute for the aluminosilicate glass, other multi-component glass may be used. Further, when required transparency is guaranteed as the cover glass for mobile terminals, crystallized glass may be used.

In the invention, the effect is particularly exhibited when the thickness of the cover glass 1 is 0.5 mm or less. Further, as glass constituting the cover glass 1, it is preferable to use the glass chemically strengthened by ion exchange treatment as described above. The chemically strengthened glass is glass strengthened by replacing alkali metal ions constituting the glass with alkali metal ions larger in size than the alkali metal ions constituting the glass. A compressive stress layer is formed in the surface of thus chemically strengthened glass.

Described next is a method of manufacturing cover glass for mobile terminals of the invention.

Figure 4:
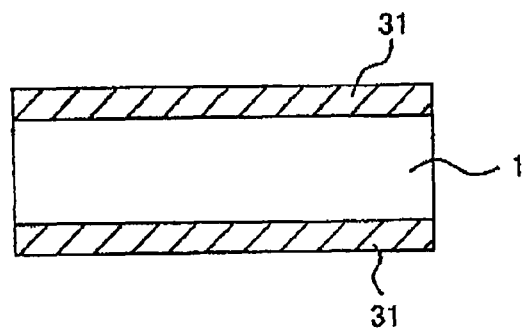
FIGS. 4(a) to 4(c) are diagrams to explain shape processing by etching of a glass substrate.
Figure 4:
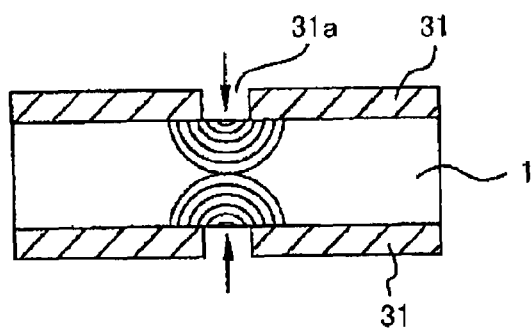
Figure 4:
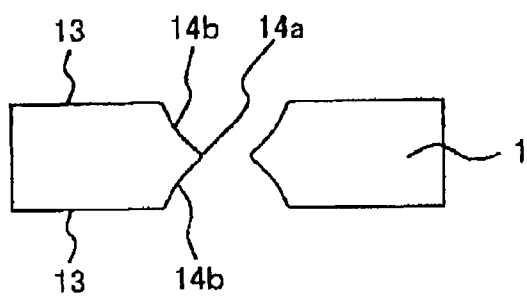

In an external form processing step in manufacturing of the cover glass, the external form processing is performed by performing photolithography and etching on a glass substrate. In an etching step, as shown in FIG. 4(a), both main surfaces of the glass substrate 1 are coated with resist materials 31. Next, the resist materials are exposed through a photo mask having a pattern with a desired external form shape (for example, external form including portions having the negative curvature). Then, as shown in FIG. 4(b), the exposed resist materials are developed, a resist pattern is formed (an opening portion 31a is formed) in an area except areas to be etched of the glass substrate, and the areas to be etched of the glass substrate are etched. At this point, in the case of using a wet etchant as an etchant, as shown in FIG. 4(b), the glass is isotropically etched, and by this means, the edge face 14 becomes the shape as shown in FIG. 4(c). In other words, in the edge face 14, a center portion 14a protrudes outward the most, and inclined surfaces 14b, 14b are formed which are gently curved respectively toward both main surface 13 sides from the center portion 14a. In addition, it is preferable that the boundary between the inclined surface 14b and the main surface 13 and the boundary (center portion 14a) between the inclined surfaces 14b are in a rounder shape with a radius of several tens of micrometers. By forming such an edge-face shape, in inserting the cover glass in a frame, etc. of a mobile terminal device, it is possible to perform insertion with ease without galling and/or chipping occurring.

As a resist material used in the etching step, any material is available which has resistance to the etchant used in etching the glass using a resist pattern as a mask. The glass is normally etched by wet etching of an aqueous solution containing hydrofluoric acid, or dry etching of fluorine gas, and therefore, for example, it is possible to use resist materials excellent in resistance to hydrofluoric acid.

As an etchant used in the etching step, it is possible to use a mixed acid containing hydrofluoric acid and at least one kind of acid among sulfuric acid, nitric acid, hydrochloric acid and hydrofluorosilicic acid, etc. By using the aforementioned mixed acid aqueous solution as an etchant, the cover glass having an extremely high surface state is obtained such that the edge face of the cover glass cut into the desired shape has surface roughness of 10 nm or less and thus has high smoothness of the order of nanometers, and that micro-cracks do not exist which are certainly formed in forming the external form by mechanical processing. Further, since photolithography is adopted in forming the external form, dimensional accuracy of the cut cover glass is also good. Accordingly, even when the shape of the external form of the cover glass for mobile terminals is a complicated shape, the cover glass with good dimensional accuracy is obtained, and it is possible to obtain high mechanical strength required for the cover glass for mobile terminals. Further, by this external form processing by photolithography and etching, it is also possible to enhance productivity and reduce the processing cost. Furthermore, as a remover solution to remove the resist material from the glass substrate, it is preferable to use an alkali solution of KOH, NaOH, etc. In addition, kinds of the resist material, etchant and remover solution are capable of being selected as appropriate corresponding to the material of the glass substrate that is a material to be etched.

Further, since the processing for external form is performed by etching step, it is possible to form the concave portion 11 and hole portion 12 including portions of the negative curvature in the cover glass with ease. Furthermore, similarly, since the etching step is used, by adjusting the mask pattern, it is possible to add a design (various shapes of the external form) such as the logo to the cover glass. By this means, it is possible to easily actualize a complicated design which will be required for the cover glass in the future but cannot be implemented by mechanical processing.

Furthermore, as the plate-shaped glass substrate, it is possible to use glass substrates that are directly formed in the shape of a sheet from molten glass, or glass substrates obtained by cutting a glass material formed in some thickness into a predetermined thickness, polishing the main surface, and finishing in a predetermined thickness. It is preferable to use glass substrates that are directly formed in the shape of a sheet from molten glass. This is because the main surface of the glass substrate that is directly formed in the shape of a sheet from molten glass is a surface formed by hot forming has extremely high smoothness, and further has a surface state without micro-cracks. Methods for directly forming the molten glass in the shape of a sheet include a down-draw method and float method. The down-draw method is preferable among the methods. In addition to the above-mentioned effects of high smoothness, etc. in the case of performing the external form processing by etching step, since it is possible to perform etching uniformly from both main surfaces in etching the both main surfaces of the glass substrate using resist patterns formed on the both main surfaces of the glass substrate as a mask, dimensional accuracy is good, and the shape in cross section of the edge face of the cover glass is excellent, thus being preferable.

Moreover, for the same reason as described above, the glass in the method of manufacturing cover glass of the invention is preferably aluminosilicate glass containing $SiO_2$, $Al_2O_3$, $Li_2O$ and/or $Na_2O$.

Further, by performing chemical strengthening by ion exchange treatment on the cover glass after the step of the external form processing by etching, a compressive stress layer is formed in the surface of the cover glass, and it is thereby possible to further enhance mechanical strength of the cover glass. In the case of using the above-mentioned plate-shaped glass substrate obtained by the method such as the down-draw method of directly forming molten glass in the shape of a sheet, since both main surfaces of the glass substrate are surfaces formed by hot forming, and thereby have surface states with extremely high smoothness without micro-cracks that are surely formed when the external from is formed by mechanical processing, the compressive stress layer formed by chemical strengthening is required to be 5 μm or more. The thickness of the compressive stress layer is preferably 50 μm or more, and more preferably, 100 μm. Since the cover glass for protecting a display screen of a mobile terminal is provided to cover the display screen, flaws are tend to occur in handling, and further, in consideration of the respect that shock and/or external force is applied by pressing the display screen repeatedly, or by opening and closing in the case of open/close type mobile terminal devices, the compressive stress layer is desired to be formed deeply.

Figure 2:
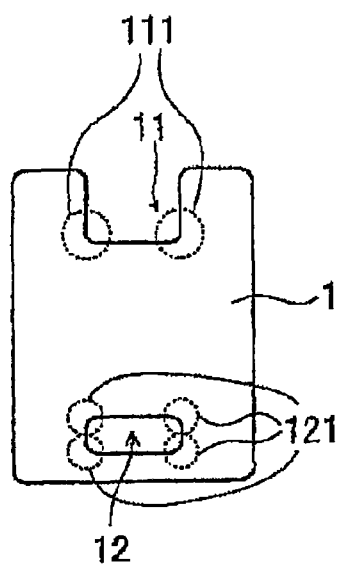
FIG. 2(a) is a diagram to explain the external form of the cover glass as shown in FIG. 1.
FIG. 2(b) is a diagram to explain the negative curvature.
FIG. 2(c) is a diagram to explain the negative curvature and positive curvature.
Figure 2:
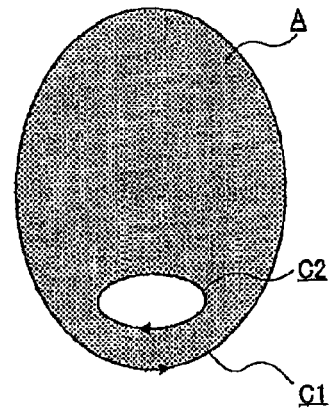
Figure 2:
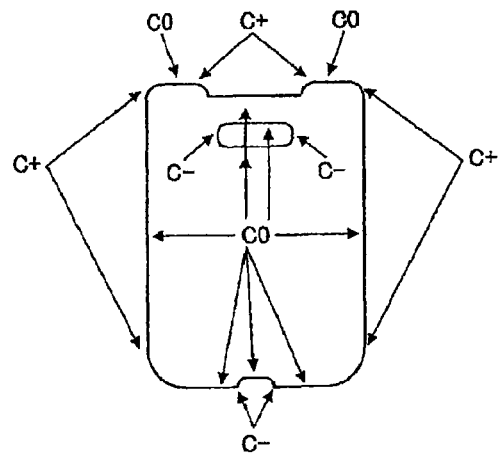

Furthermore, the cover glass 1 fabricated by the above-mentioned manufacturing method of cover glass has the main surface 13 and the edge face 14 as shown in FIG. 3, and the cross-sectional shape of the edge face 14 is almost the same in the entire edge face 14 in the external form as shown in FIG. 2. In the cover glass according to the invention, since the external form is formed by etching as described above, all of the obtained edge face 14 of the external form is formed under the same conditions. Therefore, in the case of forming the external form by wet etching, since the glass is etched isotropically, the edge face 14 is in the shape as shown in FIG. 3 over the whole of the external form.

Described next are Examples performed to clarify the effects of the invention.

Descriptions are given below using cover glass for a cellular phone to protect a display screen of the cellular phone as an example.

EXAMPLE 1

First, aluminosilicate glass containing 63.5 percent by weight of $SiO_2$, 8.2 percent by weight of $Al_2O_3$, 8.0 percent by weight of $Li_2O$, 10.4 percent by weight of $Na_2O$ and 11.9 percent by weight of $ZrO_2$ was formed into plate-shaped glass substrates (sheet-shaped glass) with a sheet thickness of 0.5 mm by a down-draw method. Surface roughness (arithmetic means roughness Ra) of the main surface of the sheet-shaped glass formed by the down-draw method was measured using an atomic force microscope, and was 0.2 nm.

Next, both main surfaces of the sheet-shaped glass were coated with negative type hydrofluoric-acid resistant resist in a thickness of 30 μm, and the hydrofluoric-acid resistant resist underwent baking processing at 150° C. for 30 minutes. Then, the hydrofluoric-acid resistant resist was exposed from the both surfaces through a photo-mask having a pattern of the external form including portions having the negative curvature as shown in FIG. 2(a), the exposed hydrofluoric-acid resistant resist was developed using a developer ($Na_2CO_3$ solution), and a resist pattern was formed where the hydrofluoric-acid resistant resist was left in areas except etching-target areas on the sheet-shaped glass.

Next, using a mixed acid aqueous solution of hydrofluoric acid and hydrochloric acid as an etchant, the etching-target areas of the sheet-shaped glass were etched from the both main surface sides using the resist pattern as a mask, and the glass was cut into the external form including the portions having the negative curvature as shown in FIG. 2(a). Then, the hydrofluoric-acid resistant resist remaining on the glass was swollen using an NaOH solution, and was removed from the glass, and rinsing treatment was performed. In this way, obtained was cover glass for a cellular phone of the Example having the external form as shown in FIG. 2(a).

When the cross-sectional shape of the edge face was examined along the external form of thus obtained cover glass (Example) using a light microscope, it was confirmed that the cross-sectional shape was the shape as shown in FIG. 4(c) and almost the same over the entire external form. Further, surface roughness (arithmetic means roughness Ra) of the main surface of the obtained cover glass was measured using an atomic force microscope, was 0.2 nm, did not change from the surface state immediately after forming by the down-draw method, and had high smoothness. Furthermore, surface roughness (arithmetic means roughness Ra) of the edge face of the cover glass was measured using the atomic force microscope, and was 1.2 to 1.3 nm over the entire external form. As the reason why surface roughness of the edge face was thus low, since the etching step was adopted without performing mechanical processing in processing the external form where the glass substrate was etched with an etchant using a resist pattern formed on the sheet glass as a mask and thereby cut into a desired shape, it is considered that brush marks and/or micro-cracks did not exist that occur in mechanical processing by polishing grain, grinding grain or the like.

Further, when the presence or absence of micro-crack of the edge face of the cover glass was checked using a scanning electron microscope, any micro-crack was not found.

EXAMPLE 2

The glass cut by etching from which the resist was removed in aforementioned Example 1 was immersed in a treatment bath of mixed acid of 60 percent of potassium nitrate ($KNO_3$) and 40 percent of sodium nitrate ($NaNO_3$) kept at 385° to 405° C. for 4 hours to undergo ion exchange treatment, and chemically strengthened cover glass for a cellular phone was prepared where a compressive stress layer of 150 μm was formed in the glass surface.

When surface roughness of the main surface and edge face was measured as in Example 1, surface roughness of the main surface was 0.3 nm and surface roughness of the edge face was 1.4 to 1.5 nm. Further, when checked whether micro-cracks were present in the edge face, it was confirmed that any micro-crack did not exist.

EXAMPLE 3

Figure 5:
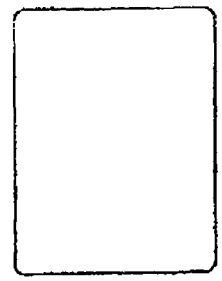
FIG. 5 is a diagram to explain a shape of cover glass of Example 3.

Cover glass for a cellular phone was prepared as in above-mentioned Example 1 except that the shape of the external form of the cover glass was a rectangular shape (size: 50 mm×40 mm, thickness: 0.5 mm) as shown in FIG. 5. Surface roughness of the main surface and edge face of the cover glass and micro-cracks were checked as in Example 1, and it was confirmed that surface roughness was the same as in Example 1, and that any micro-crack did not exist.

EXAMPLE 4

As in above-mentioned Example 1 except that a mixed acid aqueous solution of hydrofluoric acid and nitric acid was used as an etchant, the etching-target areas of the sheet-shaped glass were etched from the both main surface sides using the resist pattern as a mask, the glass was cut into the external form including the portions having the negative curvature as shown in FIG. 2(a), and the cover glass for a mobile terminal was prepared. When surface roughness of the main surface and edge face of the cover glass and micro-cracks were checked as in Example 1, surface roughness of the main surface was 0.2 nm, surface roughness of the edge face was 10 nm, and it was confirmed that any micro-crack did not exist.

Comparative Example 1

The same aluminosilicate glass as in above-mentioned Example 1 was formed into plate-shaped glass substrates (sheet-shaped glass) by the down-draw method. Next, the formed sheet glass was cut into a rectangle slightly larger than finished measurements using a scriber, processed into a desired shape by grinding the outer edge using a rotary grinder with diamond grain embedded therein, and processed into the shape as shown in FIG. 6(a).

Next, only the outer edge portion was ground using a diamond grinder, and underwent predetermined chamfering processing. Then, a hundred sheets of plate-shaped glass in the shape as shown in FIG. 6(a) were stacked, and the portion (concave portion 11) having the negative curvature was formed using a diamond grinder by mechanical processing (FIG. 6(b)).

Figure 6:
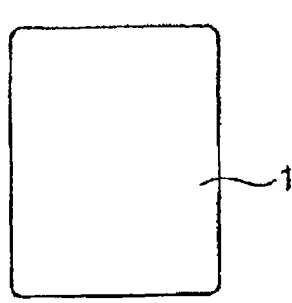
FIGS. 6(a) to 6(c) are diagrams to explain a manufacturing process to prepare the cover glass as shown in FIG. 2(a) by a manufacturing method of a Comparative Example.
Figure 6:
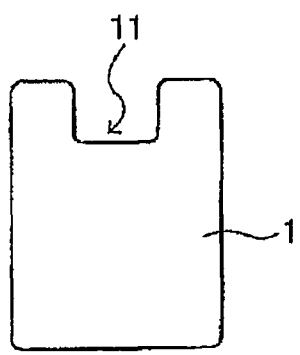
Figure 6:
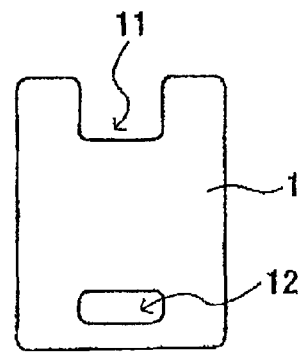

Subsequently, five sheets of plate-shaped glass in the shape as shown in FIG. 6(b) were stacked, the portion (hole portion 12) having the negative curvature was formed using a diamond grinder by mechanical processing, and the glass was formed into the shape as shown in FIG. 6(c). Then, finally both main surfaces were polished into mirror surfaces using ceric oxide, and the sheet thickness was adjusted to 0.5 mm. In this way, obtained was cover glass for a cellular phone of Comparative Example 1 having the shape as shown in FIG. 2(a).

Surface roughness Ra of the main surface and edge face of thus obtained cover glass (Comparative Example 1) was measured as in the Examples. Surface roughness of the main surface was 0.3 nm, and thus was not different from that in Example 1 so much, but surface roughness of the edge face was 0.2 μm and was a significantly large value. Further, when the presence or absence of micro-crack in the edge face of the cover glass was examined, it was confirmed there were many micro-cracks with depths ranging from dozens to hundreds of micrometers. As the reason why surface roughness Ra was thus large or many micro-cracks existed, it is considered that mechanical processing was adopted in shape processing.

Comparative Example 2

The cover glass of aforementioned Comparative Example 1 was subjected to ion exchange treatment under the same conditions as in Example 2, and chemically strengthened cover glass for a mobile terminal was prepared where a compressive stress layer was formed in the glass surface. When surface roughness of the main surface and edge face of the cover glass and micro-cracks were checked as in Comparative Example 1, it was confirmed that surface roughness was the same as in Comparative Example 1, and many micro-cracks existed.

Comparative Example 3

Cover glass for a cellular phone was prepared as in Comparative Example 2 except that in above-mentioned Comparative Example 1, the shape of the external form of the cover glass was made the same shape as shown in Example 3. When surface roughness of the main surface and edge face of the cover glass and micro-cracks were checked as in Comparative Example 1, it was confirmed that surface roughness was the same as in Comparative Example 1, and many micro-cracks existed.

(Evaluation Test of Mechanical Strength of the Cover Glass of Examples 1 to 4 and Comparative Examples 1 to 3)

The cover glass was set on a support mount coming into contact with the outer circumferential edge portion in 3 mm in the main surface of the cover glass, and static pressure strength tests were performed while pressing the center portion of the cover glass from the main surface side opposite to the side in contact with the support mount using a pressurizing member. Used as the pressurizing material was a material made of a stainless alloy having a front end with $\phi$ of 5 mm.

As a result, in the cover glass of Examples 1 to 4, the breaking load when the glass was broken exceeded 50 kgf, and the glass had the extremely high mechanical strength. Meanwhile, the cover glass of Comparative Examples 1, 2 and 3 was of 5 kgf, 14 kgf, and 17 kgf, and thus had the significantly low strength. Particularly, the cover glass of Comparative Example 1 was extremely weak in mechanical strength. When the state of cracking of the cover glass of Comparative Example 1 was checked, it was confirmed that cracking proceeded from micro-cracks existing in areas including the portions having the negative curvature.

The above-mentioned cover glass for mobile terminals of the invention is applicable to mobile terminal devices such as cellular phones by being provided above a display screen of the apparatus body having the display screen. Each of the cover glass of Examples 1 to 4 was provided on a display screen of a cellular phone, the cellular phone was subjected to a repetitive drop test, and each cover glass had high mechanical strength without any cracking being found.

The present invention is not limited to the above-mentioned Embodiment, and is capable of being carried into practice with modifications thereof as appropriate. For example, the shape of the external form, the numbers of members, sizes, processing procedures and the like in the above-mentioned Embodiment are examples, and are capable of being carried into practice with various modifications thereof within the scope of exhibiting the effects of the invention. Further, the invention is capable of being carried into practice with modifications thereof as appropriate without departing from the scope of the object of the invention.

The invention claimed is:

1. Cover glass for a mobile terminal that protects a display screen of the mobile terminal,
    wherein arithmetic mean roughness Ra is 10 nm or less as surface roughness of an edge face, the cover glass is glass that is chemically strengthened by ion exchange treatment, and has compressive stress layers in main surfaces and the edge face, and the cover glass is shaped substantially like a rectangle.

2. The cover glass for a mobile terminal according to claim 1, wherein a main surface of the cover glass is formed of a molten glass surface formed by a down-draw method, and as surface roughness of the main surface, arithmetic mean roughness Ra is 0.5 nm or less.

3. The cover glass for a mobile terminal according to claim 2, wherein the cover glass has a desired shape including a portion having a negative curvature in part of a contour constituting the cover glass.

4. The cover glass for a mobile terminal according to claim 2, wherein a plate thickness of the cover glass is 0.5 mm or less.

5. The cover glass for a mobile terminal according to claim 2, wherein the cover glass is aluminosilicate glass containing $SiO_2$, $Al_2O_3$ and at least one selected from the group consisting of $Li_2O$ and $Na_2O$.

6. The cover glass for a mobile terminal according to claim 1, wherein the cover glass has a desired shape including a portion having a negative curvature in part of a contour constituting the cover glass.

7. The cover glass for a mobile terminal according to claim 6, wherein a plate thickness of the cover glass is 0.5 mm or less.

8. The cover glass for a mobile terminal according to claim 6, wherein the cover glass is aluminosilicate glass containing $SiO_2$, $Al_2O_3$ and at least one selected from the group consisting of $Li_2O$ and $Na_2O$.

9. The cover glass for a mobile terminal according to claim 1, wherein a plate thickness of the cover glass is 0.5 mm or less.

10. The cover glass for a mobile terminal according to claim 9, wherein the cover glass is aluminosilicate glass containing $SiO_2$, $Al_2O_3$ and at least one selected from the group consisting of $Li_2O$ and $Na_2O$.

11. The cover glass for a mobile terminal according to claim 1, wherein the cover glass is aluminosilicate glass containing $SiO_2$, $Al_2O_3$, and at least one selected from the group consisting of $Li_2O$ and $Na_2O$.

12. The cover glass for a mobile terminal according to claim 11, wherein the aluminosilicate glass contains 62 percent to 75 percent by weight of $SiO_2$, 5 percent to 15 percent by weight of $Al_2O_3$, 4 percent to 10 percent by weight of $Li_2O$, 4 percent to 12 percent by weight of $Na_2O$, and 5.5 percent to 15 percent by weight of $ZrO_2$.

13. The cover glass for a mobile terminal according to claim 1, wherein the edge face of the cover glass has a protruding center portion and inclined surfaces that are declined respectively toward both main surface sides from the center portion, and boundary portions between the inclined surfaces and the main surfaces, respectively, and a boundary portion between the inclined surfaces are in a rounder shape.

14. The cover glass for a mobile terminal according to claim 1, wherein a breaking load in static pressure strength test exceeds 50 kgf.

15. The cover glass for a mobile terminal according to claim 1, wherein the cover glass has a hole portion formed through the main surfaces, the hole portion is arranged at a position shifted to one side in a longitudinal direction of the rectangle from a center of each of the main surfaces, and an inner wall face of the hole portion has a surface roughness Ra of 10 nm or less.

16. The cover glass for a mobile terminal according to claim 1, wherein the cover glass has a concave portion formed in an outer circumference, the concave portion is recessed toward an inside of each of the main surfaces in a plane, and an inner wall face of the concave portion has a surface roughness Ra of 10 nm or less.

17. A mobile terminal apparatus comprising: an apparatus body having a display screen; and
a cover glass for a mobile terminal provided above the display screen, wherein arithmetic mean roughness Ra is 10 nm or less as surface roughness of an edge face, and the cover glass is glass that is chemically strengthened by ion exchange treatment, and has compressive stress layers in main surfaces and the edge face.

18. The mobile terminal apparatus according to claim 17, wherein a main surface of the cover glass is formed of a molten glass surface formed by a down-draw method.

19. The mobile terminal apparatus according to claim 17, wherein the edge face of the cover glass has a protruding center portion and inclined surfaces that are declined respectively toward both main surface sides from the center portion, and boundary portions between the inclined surfaces and the main surfaces, respectively, and a boundary portion between the inclined surfaces are in a rounder shape.

20. The mobile terminal apparatus according to claim 17, wherein a breaking load of static pressure strength test exceeds 50 kgf.

* * * * *